US012741192B2

(12) United States Patent
Richard

(10) Patent No.: US 12,741,192 B2
(45) Date of Patent: Sep. 22, 2026

(54) METHOD AND SYSTEM FOR IMPROVED MEASUREMENT OF THE TIME OF PASSAGE ON A TIMEKEEPING LINE

(71) Applicant: Swiss Timing Ltd, Corgémont (CH)

(72) Inventor: Pascal Richard, Corgémont (CH)

(73) Assignee: Swiss Timing Ltd, Corgémont (CH)

( * ) Notice: Subject to any disclaimer, the term of this patent is extended or adjusted under 35 U.S.C. 154(b) by 1015 days.

(21) Appl. No.: 17/408,706

(22) Filed: Aug. 23, 2021

(65) Prior Publication Data

US 2022/0111285 A1 Apr. 14, 2022

(30) Foreign Application Priority Data

Oct. 9, 2020 (EP) .................................... 20201010

(51) Int. Cl.
*A63B 71/06* (2006.01)
*G04F 10/00* (2006.01)

(52) U.S. Cl.
CPC .......... *A63B 71/0686* (2013.01); *G04F 10/00* (2013.01)

(58) Field of Classification Search
None
See application file for complete search history.

(56) References Cited

U.S. PATENT DOCUMENTS 5,105,395 A * 4/1992 Imhof ...................... G07C 1/24 368/9
5,657,077 A * 8/1997 DeAngelis ............. H04N 7/122 348/222.1
6,411,329 B1 * 6/2002 Richard .................. G04F 13/02 348/157
6,545,705 B1 * 4/2003 Sigel ...................... H04N 7/188 348/222.1

(Continued)

FOREIGN PATENT DOCUMENTS

CH 706 165 A2 8/2013
EP 0 898 249 A1 2/1999

(Continued)

OTHER PUBLICATIONS

European Search Report issued Mar. 19, 2021 in European Application 20201010.4, filed on Oct. 9, 2020 (with English Translation of Categories of cited documents), 3 pages.

*Primary Examiner* — Xuan M Thai
*Assistant Examiner* — Andrew Bodendorf
(74) *Attorney, Agent, or Firm* — Oblon, McClelland, Maier & Neustadt, L.L.P.

(57) ABSTRACT

A system and a method for measurement of the time of passage on a timekeeping line of a race by a competitor, the method being implemented by a measurement system including at least one image sensor. The method includes acquiring electric signals representative of the image of the timekeeping line captured by the image sensor, the electric signals being produced according to optical signals received by the sensor. The method also includes transmitting electric signals to an image-processing unit, detecting the passage of a timekeeping line by an object, detecting information relating to the object to verify that the object corresponds to a competitor, transmitting an order to measure the time of passage to a measurement unit if the object corresponds to a competitor, measuring the time of passage of the object on the timekeeping line corresponding to the instant of passage of the object.

14 Claims, 3 Drawing Sheets

(56) References Cited

U.S. PATENT DOCUMENTS

| | | | | |
|---|---|---|---|---|
| 7,307,652 | B2 * | 12/2007 | Broemmelsiek | H04N 7/188 348/169 |
| 7,505,607 | B2 * | 3/2009 | Meunier | H04B 10/1149 382/103 |
| 8,249,329 | B2 * | 8/2012 | Silver | G06T 7/20 382/152 |
| 8,457,392 | B2 * | 6/2013 | Cavallaro | H04N 5/272 348/157 |
| 9,330,467 | B2 * | 5/2016 | Barrett | G06T 7/74 |
| 10,026,235 | B2 * | 7/2018 | Van Rens | A63B 71/0605 |
| 10,489,655 | B2 * | 11/2019 | Martin | G06F 16/5846 |
| 2001/0035907 | A1 * | 11/2001 | Broemmelsiek | G01S 11/12 348/169 |
| 2002/0149679 | A1 * | 10/2002 | Deangelis | H04N 19/156 348/157 |
| 2009/0028425 | A1 * | 1/2009 | Cavallaro | H04N 5/2723 348/157 |
| 2009/0028440 | A1 * | 1/2009 | Elangovan | H04N 5/272 382/103 |
| 2009/0160970 | A1 * | 6/2009 | Fredlund | H04N 23/633 348/229.1 |
| 2012/0082007 | A1 * | 4/2012 | Duxbury | G07C 1/24 368/10 |
| 2014/0132771 | A1 * | 5/2014 | Gustafsson | G08B 13/19613 348/152 |
| 2014/0204206 | A1 * | 7/2014 | Itoi | H04N 7/188 348/143 |
| 2015/0015675 | A1 * | 1/2015 | Richard | G04F 10/00 348/48 |
| 2016/0027325 | A1 * | 1/2016 | Malhotra | G09B 5/04 434/247 |
| 2017/0169560 | A1 * | 6/2017 | Johansson | G06T 7/20 |
| 2017/0236029 | A1 * | 8/2017 | Howell | G06V 20/00 382/159 |
| 2018/0173934 | A1 * | 6/2018 | Zink | H04N 25/76 |
| 2018/0173992 | A1 * | 6/2018 | Zink | G06N 3/063 |
| 2018/0218243 | A1 * | 8/2018 | Felsen | G06N 7/01 |
| 2020/0372725 | A1 * | 11/2020 | Martin | H04N 7/188 |
| 2021/0166497 | A1 * | 6/2021 | Kia | G06K 19/06037 |

FOREIGN PATENT DOCUMENTS

| | | | | |
|---|---|---|---|---|
| WO | WO-2013124180 | A2 * | 8/2013 | H04N 7/0806 |
| WO | WO-2015193049 | A1 * | 12/2015 | G07C 1/22 |

* cited by examiner

METHOD AND SYSTEM FOR IMPROVED MEASUREMENT OF THE TIME OF PASSAGE ON A TIMEKEEPING LINE

CROSS-REFERENCE TO RELATED APPLICATION

This application claims priority to European Patent Application No. 20201010.4 filed on Oct. 9, 2020, the entire disclosure of which is hereby incorporated herein by reference.

FIELD OF THE INVENTION

The invention relates to a method for improved measurement of the time of passage on a timekeeping line of a race by a competitor, in particular in a sport.

The invention also relates to a system for improved measurement of the time of passage on a timekeeping line of a race by a competitor, in particular in a sport, for the implementation of the method.

BACKGROUND OF THE INVENTION

In a racing sport competition, such as a sprint race in athletics, cycling, cross-country skiing, speed skating, bobsleighing, or during an equestrian event, it is well known to use sensors to measure an intermediate or final time of the competitors, in particular to carry out the ranking of the competitors. The requirements are different according to the sport. For example, in a sprint rate in athletics, the moment is defined as soon as a part of the chest of the athlete passes the finish line. For a speed skating or cross-country skiing race, the moment is defined when the skate or the foot reaches the finish line.

A sensor is for example disposed near the finish line to measure the time of passage of the competitors. For example a photoelectric cell as a receiver and an emitter of pulsed infrared light are used, the emitter and the receiver being arranged on either side, on the axis of the finish line. Thus, when a competitor crosses the finish line, the receiver no longer receives the pulsed light, which allows to deduce their time of passage. There are also apparatuses including the emitter and the receiver in the same case, to have a single system disposed at an end of the line. In this case, a reflector, for example a safety reflector, is arranged at the other end of the finish line to reflect the infrared light of the emitter towards the receiver.

However, with the current systems, it is frequent to commit measurement errors because of parasite objects detected by the sensor. Indeed, when it rains or when it snows a lot, the quantity of pulsed light can be reduced before arriving at the sensor and triggering a measurement of a timekeeping time. People can also pass in front of the sensor even though they are not race participants. In the case of a cycling race for example, cars may pass the timekeeping line, or race participants can pass the finish line in the opposite direction after a finish, in particular during mountain stages.

SUMMARY OF THE INVENTION

The goal of the invention is therefore to overcome the aforementioned disadvantages of the prior art by proposing a method for improved measurement of the time of passage on a timekeeping line of a race by a competitor, in particular in a sport, that avoids measuring parasite times of passage caused by objects or people other than race participants.

For this purpose, the invention relates to a method for improved measurement of the time of passage on a timekeeping line of a race by a competitor, in particular for a sport, the method being implemented by a system for measuring the time of passage including at least one sensor of images of the time of passage on a timekeeping line of a race by a competitor, in particular for a sport.

The method is remarkable in that it comprises the following consecutive steps:

- acquiring electric signals representative of the image of the timekeeping line captured by the image sensor, the electric signals being produced according to optical signals received by the sensor,
- transmitting the electric signals to an image-processing unit,
- detecting the passage of a timekeeping line by an object,
- detecting at least one additional piece of information relating to the movement or the dimensions of the object to verify that the object corresponds to a competitor,
- transmitting an order to measure the time of passage to a timekeeping unit if the object corresponds to a competitor, and
- measuring the time of passage of said object on the timekeeping line corresponding to the instant of passage of the object.

Thanks to this method, the additional piece of information on the movement or the dimensions of the object detected allows to verify whether it is indeed a competitor that passes the timekeeping line, and not a parasite object or a person that passes in front of the sensor by mistake. Another advantage of the invention is that this allows to use a system arranged on a single side of the timekeeping line, without having to use another device on the other side of the line.

According to a specific embodiment of the invention, the method comprises a step of transmitting the time of passage measured to a display unit.

According to a specific embodiment of the invention, since the sensor is provided with a matrix of pixels, the sensor is configured to detect the variations in optical signals received by at least a part of the pixels of the matrix to produce the electric signals.

According to a specific embodiment of the invention, the additional piece of information is the direction of movement of the object.

According to a specific embodiment of the invention, the direction of movement is detected on the columns of pixels via the modification of the pixels before and/or after the column of pixels of the timekeeping line.

According to a specific embodiment of the invention, the additional piece of information is the speed of movement of the object.

According to a specific embodiment of the invention, the additional piece of information is the height of the object.

According to a specific embodiment of the invention, the additional piece of information is the width of the object.

According to a specific embodiment of the invention, the additional piece of information is a zone of detection in which the object is expected.

According to a specific embodiment of the invention, the detection is carried out via an analysis of the variation in the electric signals.

According to a specific embodiment of the invention, the pixels of the image sensor detect the optical signals independently of each other.

According to a specific embodiment of the invention, the totality of the sensor is used during each step of the method.

The invention also relates to a system for improved measurement of the time of passage on a timekeeping line of a race by a competitor, in particular for a sport. For this purpose, the system comprises:

- an acquisition unit for acquiring electric signals representative of the image of the timekeeping line, the acquisition unit including at least one image sensor provided with a matrix of pixels, the electric signals being produced according to optical signals received by the pixels of the matrix,
- an image-processing unit for processing the electric signals transmitted by the acquisition unit, in such a way as to detect the passage of the timekeeping line by an object, the processing unit being configured to detect at least one additional piece of information relating to the movement or the dimensions of the object to verify that the object corresponds to a competitor,
- a unit for measuring the time of passage of said object on the timekeeping line corresponding to the instant of passage of the object, the acquisition unit being configured to transmit the electric signals to the image-processing unit and to transmit an order to measure the time of passage to the measurement unit if the object corresponds to a competitor.

According to a specific embodiment of the invention, the system comprises a unit for displaying the measured times.

According to a specific embodiment of the invention, the sensor is configured to continually detect the variations in at least a part of the pixels of the matrix.

According to a specific embodiment of the invention, the system comprises a camera provided with the sensor, preferably the camera is of the neuromorphic type.

According to a specific embodiment of the invention, the image-processing unit comprises an artificial intelligence module.

BRIEF DESCRIPTION OF THE DRAWINGS

The goals, advantages and features of the method and of the display system according to the invention will be clearer in the following description of at least one non-limiting embodiment illustrated by the drawings in which.

DETAILED DESCRIPTION OF THE INVENTION

According to the invention, the method is provided to allow an improved measurement of the time of passage on a timekeeping line of a race by a competitor, in particular for a sport.

The method described below relates for example to a race in athletics, cross-country skiing, speed skating, cycling, bobsleighing or an equestrian race. The method is implemented by a shooting system including at least one image sensor. Preferably, the sensor is provided with a matrix of pixels forming an image-capture surface. The sensor is configured to detect the variations in optical signals received by at least a part of the pixels of the matrix to produce the electric signals.

Figure 1:
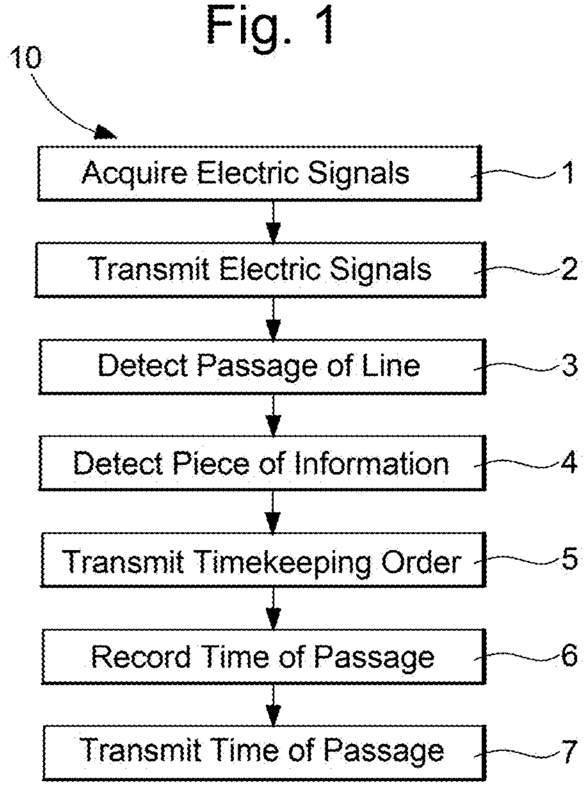
FIG. 1 is a synoptic diagram of a method for improved measurement of the time of passage on a timekeeping line according to the invention.

In FIG. 1, the method 10 according to the invention is a method for improved measurement of the time of passage on a timekeeping line of a race by a competitor, in particular in a sport.

The method comprises a first step 1 involving acquiring electric signals representative of the image of the timekeeping line captured by the image sensor. Preferably, the sensor is provided with a matrix of pixels. The sensor is configured to detect the variations in optical signals received by at least a part of the pixels of the matrix to produce the electric signals. The electric signals are produced according to optical signals received by the pixels of the sensor.

In a second step 2, the method involves transmitting the electric signals to an image-processing unit that includes a processor.

For the third step 3, the image-processing unit detects the passage of the timekeeping line by an object. The image-processing unit detects an object passing the timekeeping line, via the variation in intensity of the electric signals transmitted by the pixels of the sensor, the electric signals representing the variation in the optical signals received by the pixels. The timekeeping line is for example defined by one or more columns of pixels. Thus, when the pixels of this or these columns vary in intensity, the image-processing unit detects the passage of an object.

The fourth step 4, which is carried out preferably simultaneously to the third step, involves detecting at least one additional piece of information relating to the movement or the dimensions of the object to verify that the object corresponds to a competitor. Non-limiting examples of additional information are mentioned below. These examples can of course be combined together to detect several additional pieces of information at the same time.

According to a first embodiment, the additional piece of information is the direction of movement of the object. To detect the direction of movement, the variations in intensity of the pixels before and/or after the column(s) of pixels of the timekeeping line are detected. Thus, if the object measured passes the timekeeping line in the wrong direction, it is deduced therefrom that this is not a competitor. This embodiment is for example useful in the case of cycling races in which the finish is on a mountain, and during which certain cyclists pass the finish line again in the opposite direction to go back down to their place of stay. Illustrations of this embodiment are described for FIGS. 2 and 3.

In a second embodiment, the additional piece of information is the speed of movement of the object. For this, the processing unit calculates the speed of the object according to the speed of movement of the variation in intensity detected by the pixels of the sensor. In other words, the movement of a form defined by the intensity or the colour of the pixels of the sensor is followed. The processing unit is then configured to estimate the speed of movement of the object detected. If the speed of the object does not correspond to an expected value interval, the image-processing unit does not send an order to measure the time of passage of the object on the timekeeping line.

For the third embodiment, the additional piece of information is the height of the object. The height of the object is measured in the images formed on the basis of the electric signals. In an alternative embodiment, the additional piece of information is the width of the object. These two alternatives can also be combined to verify that this is a competitor, and not a smaller or larger object passing the timekeeping line by chance. The size of the object is evaluated on the basis of the images of the object obtained by the pixels of the sensor. The image-processing unit is configured to evaluate the dimensions of the object. An example of this embodiment is in particular shown in FIG. 2.

In a fourth embodiment, the additional piece of information is a zone of detection in which the object is expected. The zone can for example be defined above or below a line defined on the sensor. Thus, the detection is concentrated in a zone of the sensor defined by only a part of the pixels. The image-processing unit is configured to be able to choose a zone of the sensor on which objects can be detected. For example, during a cycling race, if it is desired to avoid taking a measurement of the time for a car that is not as tall as a competitor on a bicycle, a height greater than a car must be defined in order to avoid transmitting the measured time of the latter. An example of this embodiment is in particular shown in FIGS. 2 and 4.

In a fifth step 5, the image-processing unit transmits a timekeeping order to a unit for measuring the time, to record the time of passage of said object. When the image-processing unit detects an additional piece of information corresponding to a competitor, it sends a detection signal to the measurement unit at the moment of passage of the timekeeping line by the object. Thus, if the object corresponds to a competitor, the image-processing unit transmits the timekeeping order to the unit for measuring the time.

For the sixth step, the measurement unit records the time of passage of said object on the timekeeping line corresponding to the instant of passage of the object. The measurement unit is configured to time the time that passes and to record the time of each competitor, when it receives an order from the image-processing unit.

The seventh step involves transmitting the measured time of passage to a display unit, to display the time of the competitor and compare it to the times of the other competitors, for example in a ranking based on the shortest time. The display unit is for example a giant screen installed on a finish area or in front of stands of spectators.

Via this method, transmitting the measurements of competitors and avoiding measuring the time of parasite objects is ensured.

Figure 2:
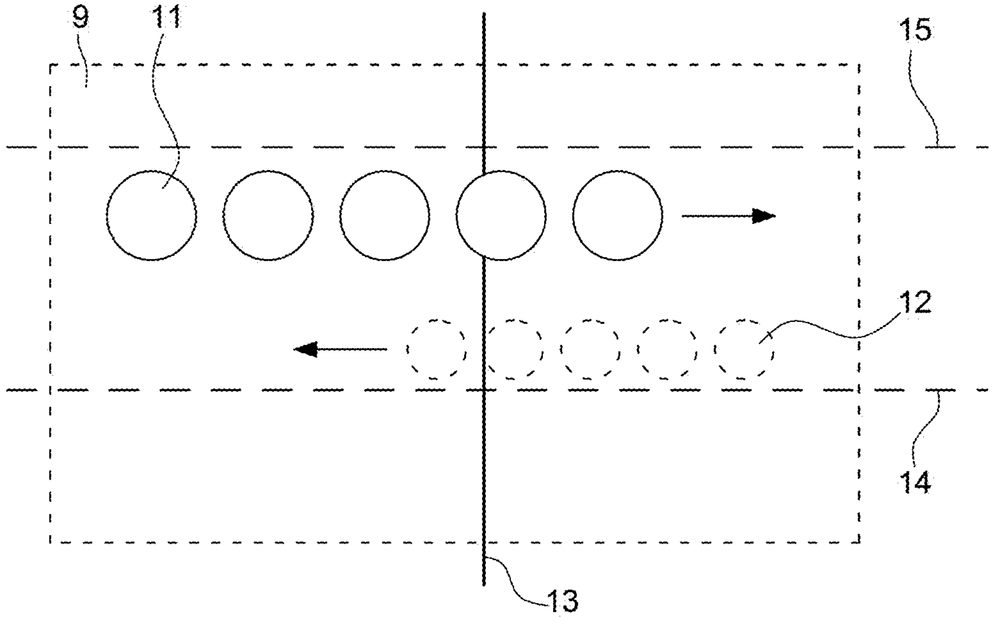
FIG. 2 is a diagram illustrating a first embodiment of the method according to the invention.

FIG. 2 shows an illustration of the image that the sensor 9 receives from the camera. In the sensor one or more columns of pixels corresponding to a timekeeping line 13 are defined. In the image, a first object 11 passes the timekeeping line 13 in the correct direction and a second object 12 passes the timekeeping line 13 in the opposite direction. According to the first embodiment of detection of the additional piece of information, the image-processing unit gives a timekeeping order for the first object passing the line in the correct direction and not for the second object passing in the other direction.

In the case of the second embodiment of detection of the additional piece of information, the image-processing unit calculates the speed of forward movement of the first object to verify that it is a competitor that is passing the timekeeping line. The position of the first object 11 is identified at several locations of the sensor, so that the image-processing unit is capable of deducing the speed of movement of the object. In the case in which the speed belongs to a time interval corresponding to the speed of a competitor, the image-processing unit transmits a measurement order to the unit for measuring the timekeeping time. On the contrary, if the speed does not belong to this interval, the image-processing unit considers that this is not a competitor and does not transmit an order.

Two lines 14, 15 allow to define the limits below and above which the objects detected are not considered to be competitors according to the fourth embodiment of detection of the piece of additional information. For example, the time of passage the first object 11 that passes between the lines 14,15 is measured, while the one passing outside of the lines 14, 15 is not timed. Only a single line can be used, and it can be defined that the competitors pass above or below the line. The positioning of the line is defined in the image sensor, and can be modified as desired to be adapted to the type of race.

Figure 3:
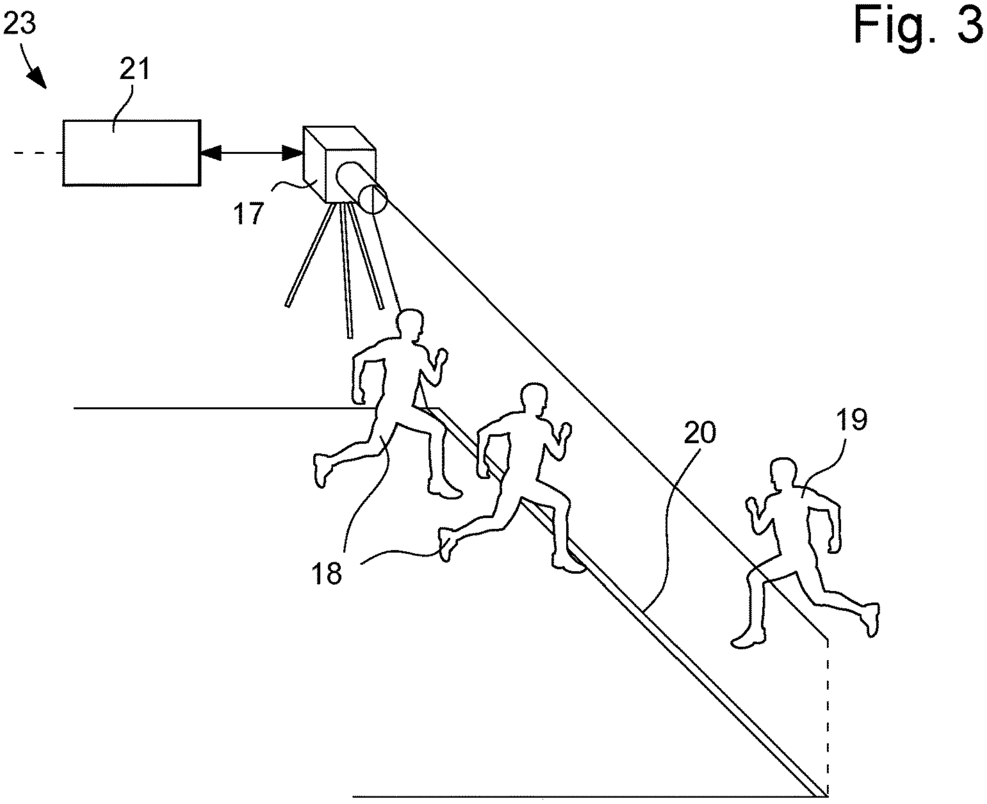
FIG. 3 is a diagram illustrating a second embodiment of the method according to the invention.

FIG. 3 shows a timekeeping line 20 of the finish line of a race type. A measurement system 23 comprises a camera 17 connected to an image-processing unit 21. The camera 17 is directed onto the line 20 so that the optical axis of the camera is substantially directed towards this line. Competitors 18 pass the line 20 in the correct direction, while a person 19 passes the line 20 in the other direction. This person 19 can be a competitor already having passed the line 20 or a referee that monitors the race. Via the method according to the invention, the timed time of the person 19 passing in the opposite direction is not measured, since the image-processing unit 21 detects that this person 19 is not moving in the suitable direction.

Figure 4:
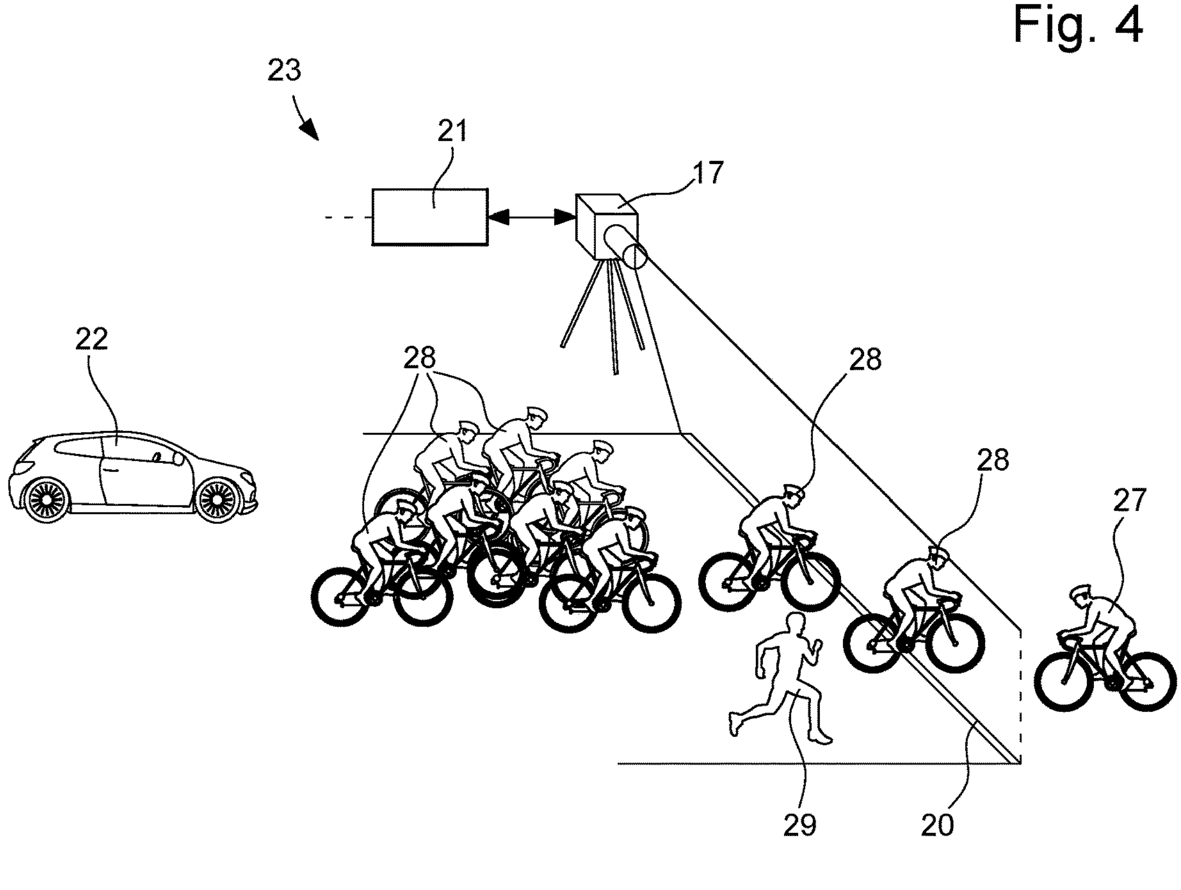
FIG. 4 is a diagram illustrating a third embodiment of the method according to the invention.

In FIG. 4, a measurement system 23 arranged to time the timekeeping line 20, which is of the finish line type, can be distinguished. This is a cycling race in which the riders on bicycles 28 pass the finish line, while cars 22 follows the riders 28 and people 27 can pass the line 20 on foot. By choosing a height or a width of the objects to be detected, or by using the recognition of the objects by the image-processing unit 21 to detect the riders, timing the car 22, the cyclist 27 passing the line 20 in the opposite direction and the person 29 passing the line on foot is avoided. Only the riders on bicycles 28 passing the line in the desired direction are timed. Alternatively, the overall silhouette of the object detected can be detected to verify that this is indeed a competitor on a bicycle 28.

Figure 5:
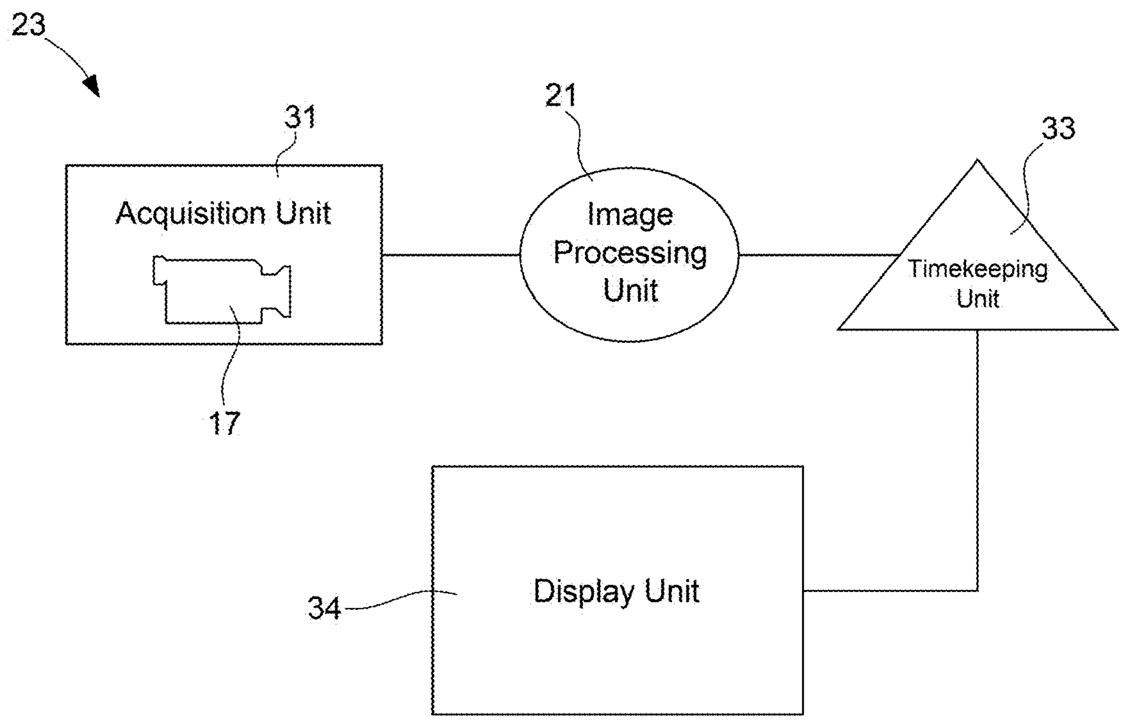
FIG. 5 is a diagram of a system for improved measurement of the time of passage on a timekeeping line according to the invention.

FIG. 5 illustrates a measurement system 23 comprising an acquisition unit 31 comprising a camera 17 provided with an image sensor. The image sensor comprises a matrix of pixels. Advantageously, the entire sensor is used for the processing of the images. In a first alternative embodiment, the frequency of acquisition of the images is preferably between 1000 Hz and 10000 Hz. Preferably, the camera 17 is of the neuromorphic type, each pixel of the sensor detecting light signals independently of each other, the corresponding electric signals being transmitted to an image-processing unit 21.

The measurement system 23 comprises an image-processing unit 21 and a timekeeping unit 33 and a display unit 34. Thus, after the steps of detection according to the method described above, the image-processing unit 21 transmits a measurement order to the timekeeping unit 33, which records the time of passage of the competitor if the object detected corresponds to a competitor. The timekeeping time can then be transmitted to the display unit 34 to display the time of the competitor in a ranking with respect to the other competitors already recorded. Optionally, the image-processing unit 21 can comprise an artificial intelligence module allowing to recognize an object passing the timekeeping line, in order to determine whether it is a competitor or a parasite object.

Naturally, the invention is not limited to the embodiments described in reference to the drawings and alternatives are possible without going beyond the context of the invention. In particular, the values of the first and second frequencies of acquisition of images can be chosen with greater values if the changes in the technical capabilities of the two types of cameras allow it.

The invention claimed is:

1. A method for improved measurement of a time of passage on a timekeeping line of a race by a competitor, the method being implemented by a measurement system comprising at least one image sensor, wherein the method comprises the following consecutive steps:

acquiring electric signals representative of an image of the timekeeping line captured by the image sensor, the electric signals being produced according to optical signals received by the image sensor, transmitting the electric signals to an image processor, detecting passage of a timekeeping line by an object, detecting at least one additional piece of information relating to movement or dimensions of the object to verify that the object corresponds to a competitor, after the object is verified to correspond to the competitor, transmitting an order by the image processor to a measurement unit in response to the object passing the timekeeping line to measure the time of passage, measuring the time of passage of said object on the timekeeping line corresponding to an instant of the passage of the object, transmitting the time of passage measured to a display, and displaying the measured times on the display, wherein the detecting of the passage of a timekeeping line by an object and detecting at least one additional piece of information relating to movement or dimensions of the object to verify that the object corresponds to a competitor are performed simultaneously, and wherein the additional piece of information is a direction of movement of the object.

2. The method according to claim 1, wherein the image sensor is provided with a matrix of pixels, and the image sensor is configured to detect variations in optical signals received by at least a part of the pixels of the matrix to produce electric signals.

3. The method according to claim 1, wherein the direction of movement is detected on columns of pixels via modification of the pixels before and/or after one or more columns of pixels of the timekeeping line.

4. The method according to claim 1, wherein the additional piece of information is a speed of movement of the object.

5. The method according to claim 1, wherein the additional piece of information is a height of the object.

6. The method according to claim 1, wherein the additional piece of information is a width of the object.

7. The method according to claim 1, wherein the detecting at least one additional piece of information comprises defining a line of the sensor horizontal to a ground surface to define a zone of detection in which the object is expected, the zone being on a side of the line in a direction away from the ground surface and being less than an entirety of the image, and limiting the detecting to a portion of the image in the zone, and the method further comprises not transmitting the order for detected objects passing on a side of the line in a direction towards the ground surface.

8. The method according to claim 1, wherein the detection is carried out via an analysis of variation in the electric signals.

9. The method according to claim 2, wherein the pixels of the image sensor detect the optical signals independently of each other.

10. The method according to claim 1, wherein the image sensor comprises a plurality of pixels and all of the pixels of the image sensor are used during each step of the method.

11. The method according to claim 1, wherein detecting the passage of the timekeeping line by the object comprises detecting variation in pixels in the timekeeping line in the image.

12. A system for improved measurement of a time of passage on a timekeeping line of a race by a competitor, the system comprising:

a camera that acquires electric signals representative of an image of the timekeeping line, the camera including at least one image sensor provided with a matrix of pixels, the electric signals being produced according to optical signals received by the pixels of the matrix, an image processor for processing the electric signals transmitted by the camera, in such a way as to detect passage of the timekeeping line by an object, the image processor being configured to detect at least one additional piece of information relating to movement or dimensions of the object to verify that the object corresponds to a competitor, a time measurement unit including circuitry configured to measure the time of passage of said object on the timekeeping line corresponding to an instant of passage of the object, and a display, wherein the camera is configured to transmit the electric signals to the image processor and, after verifying that the object corresponds to a competitor, to transmit an order to measure the time of passage to the time measurement unit in response to the object passing the timekeeping line, wherein the detecting of the passage of a timekeeping line by an object and detecting at least one additional piece of information relating to movement or dimensions of the object to verify that the object corresponds to a competitor are performed simultaneously, wherein the time of passage measured is configured to be transmitted to a display and the display is configured to display the measured times, and wherein the additional piece of information is at least a direction of movement of the object.

13. The system according to claim 12, wherein the image sensor is configured to continually detect variations in at least a part, of the pixels of the matrix.

14. The system according to claim 12, wherein the image sensor includes a neuromorphic image sensor.

* * * * *